United States Patent
Rüther et al.

[11] Patent Number: 6,047,719
[45] Date of Patent: Apr. 11, 2000

[54] METHOD AND DEVICE FOR PRODUCTION OF HIGH-PRECISION, CONTINUOUS STREAMS OF MIXED GAS

[75] Inventors: Horst Rüther, Hart/Graz; Roland Raith, Graz, both of Austria

[73] Assignee: AVL Medical Instruments AG, Schaffhausen, Switzerland

[21] Appl. No.: 09/218,031

[22] Filed: Dec. 22, 1998

[30] Foreign Application Priority Data

Dec. 22, 1997 [AT] Austria ..................................... 2170/97

[51] Int. Cl.⁷ .................................................. G05D 11/13
[52] U.S. Cl. .......................... 137/3; 137/606; 137/624.2
[58] Field of Search ................. 137/624.11, 606, 137/607, 3, 1, 624.15, 624.2

[56] References Cited

U.S. PATENT DOCUMENTS

| | | |
|---|---|---|
| 3,841,344 | 10/1974 | Slack . |
| 3,946,104 | 3/1976 | Förster et al. . |
| 4,062,373 | 12/1977 | Clark et al. ........... 137/624.2 X |
| 4,162,689 | 7/1979 | Zdrodowski . |
| 4,183,897 | 1/1980 | Lanteri . |
| 4,345,610 | 8/1982 | Herter et al. . |
| 4,345,612 | 8/1982 | Koni et al. . |
| 4,377,278 | 3/1983 | Bärmann . |
| 4,392,514 | 7/1983 | Farley et al. . |
| 4,526,188 | 7/1985 | Olsson et al. . |
| 4,938,256 | 7/1990 | Wiegleb et al. ................ 137/607 X |
| 5,002,591 | 3/1991 | Standford . |

FOREIGN PATENT DOCUMENTS

| | | |
|---|---|---|
| 0056148 | 7/1982 | European Pat. Off. . |
| 301824 | 2/1989 | European Pat. Off. . |
| 2123961 | 12/1973 | Germany . |
| 3135455 | 4/1983 | Germany . |

*Primary Examiner*—Kevin Lee
*Attorney, Agent, or Firm*—Watson Cole Grindle Watson, P.L.L.C.

[57] ABSTRACT

In a gas mixing system for producing high-precision, continuous streams of mixed gas consisting of a plurality of individually metered gas components, with an individual gas line including a pressure reducing element and, if desired, a precision pressure regulator for each gas component, precision is further improved by providing that each gas line lead to a separate valve which is timed by electronic control means, the valves being connected at the input side via a jointly vented system of lines for pressure equalization, and communicating at the output side via a mixed gas line with a mixing chamber downstream thereof.

16 Claims, 1 Drawing Sheet

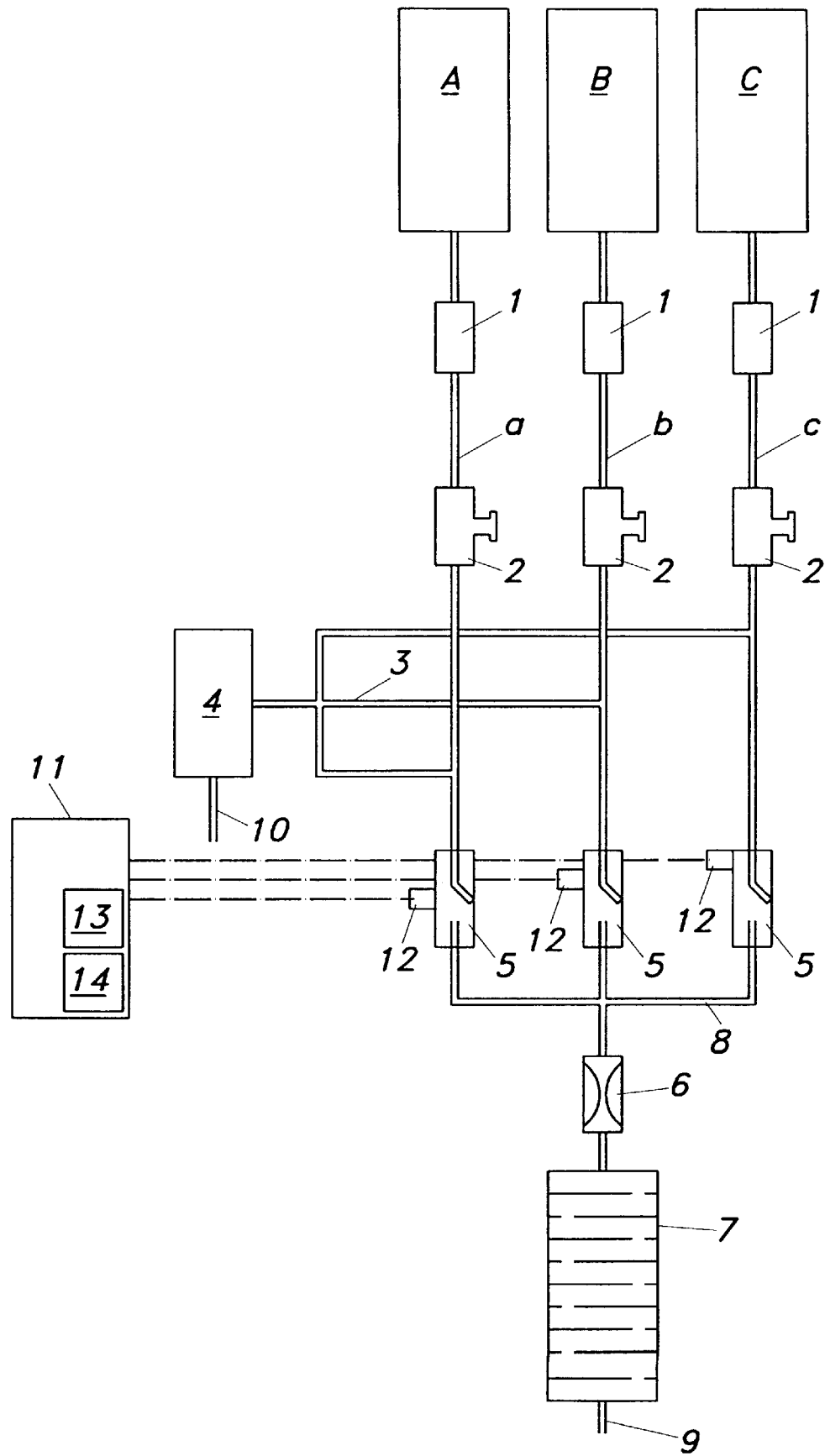

METHOD AND DEVICE FOR PRODUCTION OF HIGH-PRECISION, CONTINUOUS STREAMS OF MIXED GAS

BACKGROUND OF THE INVENTION

This invention relates to a method of producing precise and continuous mixed gas streams consisting of a plurality of individually metered gas components, and a gas mixing system for producing such streams, an individual gas line including a pressure reducing element and, if desired, a precision pressure regulator, being provided for each gas component.

DESCRIPTION OF THE PRIOR ART

Apart from the classical methods of producing gas mixtures (manometric, gravimetric, volumetric), which are used primarily for making bottled gases, some processes are known in the art which concern the production of continuous streams of mixed gases.

There is widespread use of systems or processes measuring and controlling the flow of single gases, utilizing the heat transport from preheated elements, for example. Such systems usually exhibit an absolute deviation of about 1% from the target value of the mixing ratio, the latter being adjustable over a wide range.

The results obtained with the use of metering pumps are much more accurate, though such pumps are hardly suited for a continuous gas flow, in addition to being costly and quickly susceptible to wear.

Another alternative would be systems of apertures featuring high-precision apertures which permit gases to pass through at velocities higher than the speed of sound. In DE 21 23 961, for instance, there is disclosed a gas mixing system for producing continuous streams of mixed gases at a predetermined mixing ratio, where each gas component is assigned to a group of apertures downstream of a pressure precision control. Each group comprises two apertures which are connected in parallel at the input side, the aperture of one gas component being connected at the output side to an aperture of the other gas component, thus forming a passage for the gas mixture.

In a system with two primary gas sources the above arrangement will permit calibration gases to be withdrawn from an output line at two fixed mixing ratios. Such systems allow very high accuracy (deviation in mixing ratio <0.03%), but are suited only for applications in which but a few fixed gas mixtures are required.

Further known in the art are gas mixing systems featuring high-precision flow resistors instead of apertures. The disadvantage of such devices is their sensitive response to changes in secondary pressure, however.

Another simple technical conception is the timed control of the mixing process. Fast acting valves produce gas segments which are mixed in a suitably dimensioned mixing chamber to form a homogeneous gas mixture. These cost-effective gas mixing systems, which are adjustable over a wide range, will help obtain accurate gas mixtures, where deviations from target values are less than 0.2%. Such a gas mixing system is disclosed in DE 31 35 455 A1. The two gas components (oxygen and nitrogen, for instance) are delivered via two component feed lines in order to obtain a predetermined mixing ratio. The two component feed lines are connected to a pneumatically controlled two-way valve, which will establish a timed connection between either one of the two feed lines and a common output line by means of a pulse generator for a predefined pulse duration determining the mixing ratio. By means of a pressure-reducing element the common output line is connected to a throttle whose outlet opens into a buffer tank. The gas mixture is withdrawn from the tank via a discharge line. The accuracy obtained with such gas mixing systems is limited mainly by the delay time of the two-way valve during switchover from one gas component to the other.

SUMMARY OF THE INVENTION

It is an object of this invention to propose a method for producing high-precision, continuous streams of mixed gases as well as a corresponding gas mixing system, which is adjustable over a wide range whilst achieving the same accuracy as conventional aperture arrangements.

According to the invention this object is achieved by providing that (a) the input pressure of each gas component is reduced to a settable nominal pressure and precision-controlled, if required, (b) the individual gas components are connected via a jointly vented system of lines for pressure equalization, (c) the individual gas components are delivered to timed valves, (d) the timed valves are connected via a mixed gas line to a mixed gas chamber downstream of said line.

In order to ensure that an equal primary pressure will prevail upstream of all timed valves the individual gas components are seemingly short-circuited via a system of delivery lines. To prevent the individual gas components from combining in this area, the system of delivery lines connecting the individual gas components is vented by a pressure regulator. The gas streams of the individual components are designed such that their flow volumes will always exceed the volume flowing through the timed valve open at the time. This implies that the pressure regulator will also vent a certain percentage of the gas component whose corresponding valve is open at the time in question. At each point in time of the mixing process gas components whose timed valves are closed are vented through the pressure regulator. This will enhance pressure equalization upstream of the individual, timed valves.

In further development of the invention the proposal is put forward that a common outlet aperture be placed upstream of the mixing chamber, through which the mixed gas will flow at a velocity greater than sonic speed. This will make the system insensitive to variations in secondary pressure, such that deviations in the composition of the gas mixture from the target value may be further reduced.

In the instance of a switchover from one gas component A to another gas component B, the newly assigned component B is first of all forced to assume the flow velocity of the previous gas A, which was held in the mixed gas line before and is now in the region of the aperture. The two components will then combine and a change in flow velocity will take place until A has been expelled completely.

Advantageously, the cycle times of the individual, timed valves are calculated by allowing for the different gas parameters of the individual gas components. In this way different, gas-specific flow factors may be taken into consideration both during the phase of continuous flow and at the time of switching over from one gas component to the other.

According to the invention the accuracy of the mixing ratio is further increased by measuring the mechanical switching delays of the timed valves and taking them into account in calculating cycle times. In solenoid-actuated, timed valves the current characteristics of the valves are advantageously utilized for determining mechanical switching delays, for example. As a consequence, errors occurring due to differences in the response times of the individual valves, or due to valve wear, may be avoided.

In order to eliminate the influence of differences in ambient temperature on the mixing system, the system as a whole, or at least the timed valves and apertures may be maintained at a uniform temperature level. It would also be possible in a cost-effective variant of the invention, to calculate the cycle times of the individual, timed valves by taking into account ambient temperature.

To accelerate switching processes, the timed valves are advantageously operated at a multiple of their rated voltage, i.e., preferably at three times the rated voltage, at the time of switching.

A gas mixing system for producing high-precision, continuous streams of mixed gases is thus provided with an individual gas line including a pressure reducing element and, if desired, a precision pressure regulator, for each gas component, each of these gas lines according to the invention leading to a valve which is timed by electronic control means, the valves being connected at the input side via a commonly vented system of lines for pressure equalization, and communicating at the output side, via a mixed gas line, with a mixing chamber downstream thereof. At the output side the timed valves are connected to a joint outlet aperture, which is positioned upstream of the mixing chamber.

The high precision of the process and gas mixing system described by the invention is achieved by several measures:

Use of fast acting valves, which are operated at a multiple of their rated voltage at switching time.
Compensation of mechanical switching delays.
Allowing for different flow velocities specific to the individual gas components.
Compensation of different flow velocities specific to the individual gas components upon switchover from one gas component to the other.
Optimization of cycle times relative to the selected volume of the mixing chamber.
Keeping the dead volume between valve outputs and aperture or mixing chamber at a minimum.

DESCRIPTION OF A PREFERRED EMBODIMENT

The invention will now be further described with reference to the accompanying drawing representing a schematical diagram of a possible variant.

The gas mixing system for producing high-precision, continuous streams of mixed gases, which is shown in this drawing, is provided with a pressure reducing element 1 and a precision pressure regulator 2, such as a needle valve, downstream thereof in each gas line a, b, c for the individual gas components A, B, C. Each of gas lines a, b, c leads to a timed valve 5, which valves 5 are connected at the input side via a jointly vented system of lines 3 for pressure equalization. The system of lines 3 is vented via a pressure regulator 4, such as a relief valve, as soon as the set pressure level is surpassed. At the output side the valves 5 are connected via a mixed gas line 8 of small dead volume with a joint outlet aperture 6 opening into a mixing chamber 7. The high-precision, continuous mixed gas stream may be withdrawn at the output 9 of the mixing chamber 7; output 10 of the pressure regulator 4 serves as an escape for the waste gas during operation of the system.

As has been stated above, all gases supplied must be prepared such that the primary pressure (2 bar, for example) is the same for all gas components A to C at all timed valves 5. This is advantageously achieved by using pressure reducing elements and seemingly "short-circuiting" the gases (lines 3). To obtain the desired mixture, the individual gas components are released by valves 5 at a timed sequence. Switching each valve does not take more than 2 to 4 ms, i.e., a very short time compared to valve opening and closing times. Compensation of mechanical switching delays is essential for high mixing precision. The electronic control means 11 for the valves 5 may include a measuring device 12 determining the mechanical switching delays of the individual, timed valves 5, such as a device for measuring the current characteristics of solenoid-actuated, timed valves. Since mechanical switching delays will differ from valve to valve, continual interpretation of current characteristics is recommended in order to compensate switching delays, or, at least, the typical switching delay should be determined once, by means of a suitable measuring method.

To allow for differences in flow velocities specific to the individual gases during the continuous gas flow or at the time of switchover, the electronic control means 11 may be provided with a memory element 13 storing the different gas parameters (for example, standardized flow factors for N=1.00, for $CO_2$=0.79, for $O_2$=0.94) of the individual gas components, and with a unit 14 for calculating the cycle times of the individual, timed valves 5 in dependence of the different gas parameters.

As regards the dead volume of mixed gas line 8 between the outputs of the timed valves 5 and the outlet aperture 6, it will be seen that the different types of gases will produce different flow volumes upon their passage through the aperture 6, which volumes can be taken into account when valve cycle times are calculated.

If a mixed gas is produced which consists of 50%$O_2$ and 50%$CO_2$, for example, the opening time of the timed valve will be shorter for $O_2$ than for $CO_2$ on account of the different flow factors. Furthermore, all other facts referred to above, such as different flow velocities during switchover, compensation of mechanical switching processes, etc. will enter calculation of cycle times.

In the mixing chamber 7 the individual gas segments of gas components A to C will combine to form a homogeneous gas mixture. The dimensions of the mixing chamber, or rather, its volume should be as large as possible; the maximum size of the mixing chamber will be defined by the duration of the mixing process which is still acceptable. As extremely short cycle times will multiply deviations in valve switching times, and extremely long cycle times will have adverse effects on the homogeneity of the mixed gas, the ideal cycle time may be calculated once the size of the mixing chamber is chosen. Good results, with an absolute deviation of <0.03% from the target value, were obtained with a dead volume of 12 µl in the mixed gas line and a cycle time of 2s.

What is claimed is:

1. A method for producing a high-precision, continuous stream of mixed gas consisting of a plurality of individually metered gas components, comprising the steps of
   a) reducing the input pressure of each of said individually metered gas components to a settable nominal pressure,
   b) connecting said individual gas components via a jointly vented system of lines for pressure equalization,
   c) delivering said individual gas components to individual, timed valves, and
   d) connecting said timed valves via a mixed gas line to a mixing chamber downstream of said mixed gas line.

2. A method according to claim 1, wherein each of said individually metered gas components is precision-controlled.

3. A method according to claim 1, wherein a common outlet aperture is placed upstream of said mixing chamber, accelerating said mixed gas to a velocity greater than sonic speed.

4. A method according to claim 1, wherein cycle times of said individual, timed valves are calculated based on the different gas parameters of said individual gas components.

5. A method according to claim 1, wherein mechanical switching delays of said individual, timed valves are measured and taken into account in calculating cycle times.

6. A method according to claim 5, using solenoid-actuated, timed valves, wherein current characteristics of said solenoid-actuated valves are utilized for determining mechanical switching delays.

7. A method according to claim 1, wherein cycle times of said individual, timed valves are calculated by taking into account ambient temperature.

8. A method according to claim 1, wherein said individual, timed valves are operated at a multiple of their rated voltage at the time of switching.

9. A method according to claim 8, wherein said individual, timed valves are operated at three times the rated voltage.

10. A gas mixing system for producing a high-precision, continuous stream of mixed gas consisting of a plurality of individually metered gas components comprising:

individual gas lines including pressure reducing elements for each of said individually metered gas components;

valves situated in each of said gas lines, each of said valves being timed by electronic control means and having an input side and an output side;

a commonly vented system of lines for pressure equalization being connected at said input sides of said valves; and a mixing chamber communicating with said output sides of said valves via a mixed gas line.

11. A gas mixing system according to claim 10, wherein each of said individual gas lines is provided with a precision pressure regulator.

12. A gas mixing system according to claim 10, wherein said timed valves are connected at said output sides to a joint outlet aperture, which is positioned upstream of said mixing chamber.

13. A gas mixing system according to claim 10, wherein said electronic control means is provided with a memory for storage of different gas parameters of said individual gas components and with a unit for calculating cycle times for said timed valves in dependence of said different gas parameters.

14. A gas mixing system according to claim 10, wherein said electronic control means is provided with a sensing element for detection of different gas parameters of said individual gas components and with a unit for calculating cycle times for said timed valves in dependence of said different gas parameters.

15. A gas mixing system according to claim 10, wherein said electronic control means includes a measuring device determining mechanical switching delays of said timed valves.

16. A gas mixing system according to claim 15, wherein said measuring device is a device for measuring the current characteristics of a solenoid-actuated, timed valve.

* * * * *